W. G. JAHNKE.
STEERING MEANS FOR VELOCIPEDES OR THE LIKE.
APPLICATION FILED JUNE 19, 1915.
1,162,364.
Patented Nov. 30, 1915.
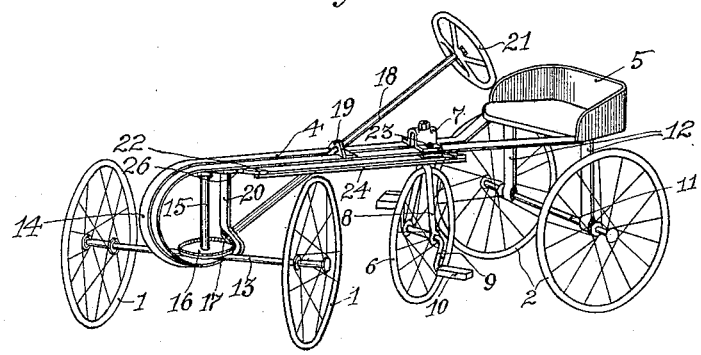
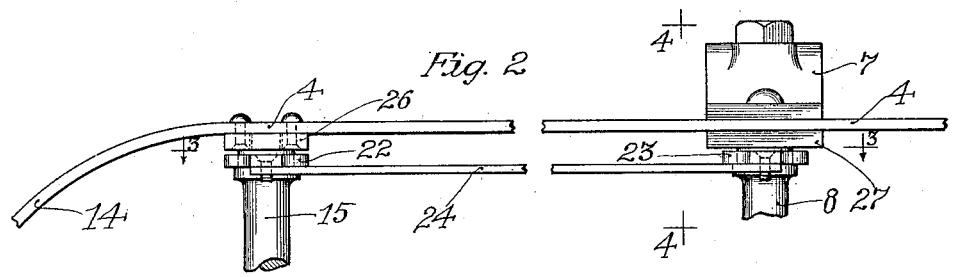
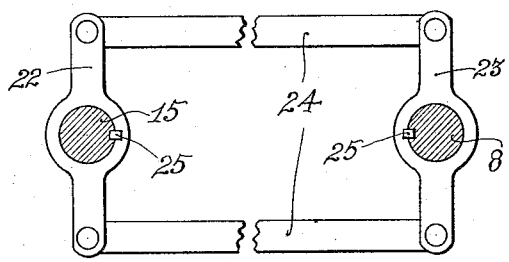 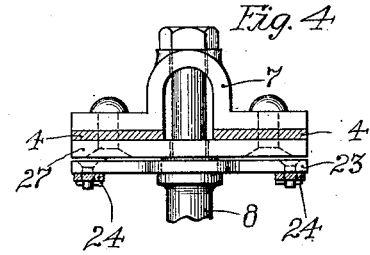
Inventor
William G. Jahnke
By Brown, Hanson & Boettcher
Attorneys.

UNITED STATES PATENT OFFICE.

WILLIAM G. JAHNKE, OF CHICAGO, ILLINOIS.

STEERING MEANS FOR VELOCIPEDES OR THE LIKE.

1,162,364.  Specification of Letters Patent.  Patented Nov. 30, 1915.

Application filed June 19, 1915. Serial No. 34,987.

*To all whom it may concern:*

Be it known that I, WILLIAM G. JAHNKE, a citizen of the United States, residing at Chicago, in the county of Cook and State of Illinois, have invented a certain new and useful Improvement in Steering Means for Velocipedes or the like, of which the following is a full, clear, concise, and exact description, reference being had to the accompanying drawings, forming a part of this specification.

My invention relates to children's automobiles, more particularly to the steering mechanism.

In my Patent No. 1,146,880 issued July 20, 1915, I have shown and described a child's automobile, the frame of which is mounted upon two front wheels and two rear wheels. The vehicle is propelled by a driving wheel suitably secured to the frame at a point substantially midway between the front and the rear axles.

The object of the present invention is to provide suitable means for steering the traction wheel in common with the front or steered wheels. I secure this object in one form of my invention by maintaining the axis of the traction wheel approximately parallel wth the axis of the front wheel, thereby eliminating any tendency for the driving wheel to be dragged sidewise over the ground. The manner in which this is accomplished will be understood from the following specification, taken in connection with the drawings, in which, Figure 1 is a perspective view of a child's automobile embodying my invention; Fig. 2 is an enlarged side elevational view of a part of the steering mechanism; Fig. 3 is a plan view of the parts shown in Fig. 2 taken along the line 3—3, and Fig. 4 is a cross-sectional view taken along the line 4—4 of Fig. 2.

The child's automobile shown in the above figures is provided with front wheels 1—1 and rear wheels 2—2, connected by means of the three-point suspension frame 4. The frame 4 is made light and flexible so that it will bend under the weight of a child. A seat 5, which may be of any convenient size or material, is mounted on the rear part of the frame at a convenient distance from the driving wheel 6. A plate or bracket 7 is riveted or otherwise rigidly secured to the frame 4 in which the fork 8 is pivotally mounted. The driving wheel 6 is mounted so that it will be free to rotate in the crotch of the fork 8 and is provided with a crank 9 and the pedals 10—10, to be operated by the driver.

When the vehicle is unoccupied the flexibility of the frame 4 causes the driving wheel 6 to be either raised away from the ground or in contact with the ground to such a slight extent that it is capable of but little, if any, tractive effort. When the driver takes his place in the seat of the car, his weight bends the frame and causes the driving wheel to be brought down into firm engagement with the road. The weight of the driver causes the driving wheel to remain in constant contact with the ground and to conform with any irregularities which may be in the road.

The rear wheels 2—2 are mounted on an axle 11, which is fastened to the depending legs 12—12 of the frame 4. The rear wheels are preferably free to rotate on the shaft in order to decrease the friction and to allow differential movement when the vehicle is turning. The front wheels 1—1 have bearings on the front axle 13, which is mounted on the frame 4 by means of a loop 14 forming an extension of the frame 4. A post 15 is attached to the axle 13 and forms a part thereof. This post is mounted vertically in the loop 14, being secured thereto by suitable bolts or the like, and carries a beveled gear 16 for engagement with a corresponding beveled gear 17 mounted on the steering column 18. The steering column has its bearings in a bracket 19 secured to the top of the frame 4 and in a depending bracket 20 secured on the bottom of the frame 4.

A suitable steering wheel 21 is secured to the steering column 18 in suitable proximity to the seat 5. In operation the weight of the driver upon the seat 5 brings the traction wheel 6 into engagement with the road-bed with sufficient pressure to allow of driving the toy in a manner similar to a velocipede. The wheel 6 is preferably of as large a diameter as can conveniently be secured in order to increase the speed with which the machine may be driven as well as to allow of a greater traction surface. The wheels 1, 2 and 6 are preferably provided with rubber tires, but the same is not absolutely necessary. I find that a much better tractive effort is secured by the use of a resilient tire on the traction wheel.

The mechanism for steering the driving wheel 6 in connection with the front wheels 1—1 will now be described. A rod or bar 22 is rigidly mounted on the post 15 parallel with the axle 13. A similar rod or bar 23 is rigidly mounted on the fork 8 parallel with the axis of the driving wheel 6. I have shown the bars 22 and 23 held in place on the post 15 and fork 8, respectively, by means of keys 25—25. Any other suitable means may be employed. The lower end of the post 15 is rigidly fastened to the gear 16 and axle 13, so that all of these parts turn together. A plate 26 is riveted or otherwise secured to the frame 4 and is provided with an opening through which the upper end of the post 15 projects, the opening being slightly larger than the post 15, so that the latter may be turned freely.

Referring to Fig. 4 it will be seen that a plate 27 is riveted to the under side of the frame 4. The plate 27 and the housing 7 are provided with central openings through which the upper end of the fork 8 passes. These openings are slightly larger than the fork 8, in order that the latter may be freely turned.

As clearly shown in Fig. 3, the ends of the bars 22 and 23 are secured together by means of connecting rods 24—24, which are made the same length, so that the axis of the axle 13 will be substantially parallel to the axis of the driving wheel 6. The connecting rods 24—24 are loosely secured to the bars 22 and 23 by means of bolts, rivets or the like, in order that there will be no binding action. It will now be clear that the driving wheel 6 and the two front wheels always rotate in a definite fixed relation, and that when the two front wheels are turned the driving wheel 6 is also turned to the same extent. With the above-described arrangement any tendency for the driving wheel to be dragged sidewise over the ground while turning is entirely overcome.

While I have illustrated one particular embodiment of my invention, it is to be understood that a number of modifications will be apparent to those skilled in the art, all of which I consider to come within the spirit and scope of my invention.

What I claim as new and desire to secure by Letters Patent of the United States is:

1. In a vehicle of the class described, a pair of rear wheels, a pair of front wheels, a frame joining said front and rear wheels, a traction wheel intermediate said front and said rear wheels and steering means for steering said front wheels and said traction wheel.

2. In a vehicle of the class described, a pair of rear wheels, a pair of front wheels, a frame joining said front and rear wheels, a traction wheel intermediate said front and said rear wheels and means for maintaining the axis of said traction wheel approximately parallel with the axis of said front wheels.

3. In combination a pair of front wheels, a pair of rear wheels, a flexible frame joining said front and rear wheels, a traction wheel intermediate said front and said rear wheels a steering column for steering said front wheels and means for maintaining the axis of said traction wheel approximately parallel with the axis of said front wheels.

4. In a vehicle of the class described, a rear axle, a pair of wheels mounted on said axle, a front axle, a pair of wheels mounted on said front axle, a frame joining said front and rear axles, a traction wheel intermediate said front and said rear wheels, a post secured to said front axle, a steering column for turning said front axle and said post and means secured to said post for steering said traction wheel.

5. In a vehicle of the class described, a pair of rear wheels, a pair of front wheels, a frame joining said front and rear wheels, a fork pivotally mounted on said frame intermediate said front and said rear wheels, a traction wheel mounted in the crotch of said fork, and steering means for steering said front wheels and said traction wheel.

6. In a vehicle of the class described, a pair of front wheels, a pair of rear wheels, a frame joining said front and said rear wheels, a traction wheel intermediate said front and said rear wheels, and common means for steering said front wheels and said traction wheel.

In witness whereof, I hereunto subscribe my name this 15th day of June, A. D. 1915.

WILLIAM G. JAHNKE.

Copies of this patent may be obtained for five cents each, by addressing the "Commissioner of Patents, Washington, D. C."